US012657720B2

(12) United States Patent
Lattanzi et al.

(10) Patent No.: US 12,657,720 B2
(45) Date of Patent: Jun. 16, 2026

(54) SYSTEMS AND PROCESSES FOR AUTOMATED DETECTION AND CHARACTERIZATION OF SKIN FEATURES USING MACHINE LEARNING

(71) Applicant: George Mason University, Fairfax, VA (US)

(72) Inventors: David Alan Lattanzi, Fairfax, VA (US); Katherine Ramelle Scafide, Potomac, MD (US); Janusz Wojtusiak, Manassas, VA (US)

(73) Assignee: George Mason University, Fairfax, VA (US)

( * ) Notice: Subject to any disclaimer, the term of this patent is extended or adjusted under 35 U.S.C. 154(b) by 283 days.

(21) Appl. No.: 18/478,466

(22) Filed: Sep. 29, 2023

(65) Prior Publication Data

US 2024/0185419 A1 Jun. 6, 2024

Related U.S. Application Data

(60) Provisional application No. 63/429,334, filed on Dec. 1, 2022.

(51) Int. Cl.
 G06K 9/00 (2022.01)
 G06N 3/045 (2023.01)
 (Continued)

(52) U.S. Cl.
 CPC ........... G06T 7/0014 (2013.01); G06N 3/045 (2023.01); G06N 3/09 (2023.01); G06V 10/774 (2022.01);
 (Continued)

(58) Field of Classification Search
 CPC ......... G06T 7/0014; G06T 2207/20081; G06T 2207/20084; G06T 2207/30088;
 (Continued)

(56) References Cited

U.S. PATENT DOCUMENTS 8,014,569 B2 9/2011 Durkin et al.
10,379,035 B2 8/2019 Noda et al.
(Continued)

FOREIGN PATENT DOCUMENTS

CN 109978873 A * 7/2019 ............... G06T 5/40

OTHER PUBLICATIONS

Tirado, et al., "Bruise dating using deep learning", Journal of Forensic Sciences, 2021; 66: 336-346.

*Primary Examiner* — Xin Jia
(74) *Attorney, Agent, or Firm* — Bradley Arant Boult Cummings LLP; Daniel E. Sineway, Esq.

(57) ABSTRACT

Aspects of the present disclosure generally relate to systems and processes for automated skin feature detection and analysis, and more particularly to identifying and assessing the characteristics and age of skin contusions, bruises, and other similar skin features using a deep learning model. Images of a patient's body part are captured via a digital camera with a light source. The parameters of the light source are determined, and other information is gathered, including skin color and medical history of the patient/subject. Images of an injured area are combined with contextual clinical information as inputs to a machine learning model. The machine learning model detects and estimates characteristics of skin features. In an exemplary embodiment, the machine learning model detects bruises on the skin, and estimates their age and outputs the estimate to an end user along with a measurement of the uncertainty in the estimate.

17 Claims, 7 Drawing Sheets

(51) Int. Cl.

| | |
|---|---|
| *G06N 3/09* | (2023.01) |
| *G06T 7/00* | (2017.01) |
| *G06V 10/774* | (2022.01) |
| *G06V 10/82* | (2022.01) |
| *G06V 40/10* | (2022.01) |

(52) U.S. Cl.
CPC .............. *G06V 10/82* (2022.01); *G06V 40/10* (2022.01); *G06T 2207/20081* (2013.01); *G06T 2207/20084* (2013.01); *G06T 2207/30088* (2013.01); *G06T 2207/30196* (2013.01)

(58) Field of Classification Search
CPC . G06T 2207/30196; G06T 2207/10024; G06T 7/0012; G06N 3/045; G06N 3/09; G06V 10/774; G06V 10/82; G06V 40/10
See application file for complete search history.

(56) References Cited

U.S. PATENT DOCUMENTS

2020/0294234 A1* 9/2020 Rance ..................... G06F 18/22
2021/0402208 A1* 12/2021 Edgar .................. A61B 5/0064

* cited by examiner

SYSTEMS AND PROCESSES FOR AUTOMATED DETECTION AND CHARACTERIZATION OF SKIN FEATURES USING MACHINE LEARNING

CROSS-REFERENCE TO RELATED APPLICATIONS

This application claims the benefit of, and priority to, U.S. Provisional Patent Application No. 63/429,334, filed on Dec. 1, 2022 and entitled "Bruise Detection," the entirety of which is incorporated by reference as if fully set forth herein.

GOVERNMENT SUPPORT

This invention was made with government support under grant number 15PNIJ-21-GG-04145-SLFO awarded by the Department of Justice. The government has certain rights in the invention.

TECHNICAL FIELD

The present systems and processes relate generally to automated skin feature detection and characterization in medical and forensic images, and more particularly to identifying and assessing the characteristics and age of skin contusions, bruises, and other similar skin features using data fusion and a deep learning model.

BACKGROUND

Law enforcement and prosecutors rely heavily on the accuracy and interpretation of injury documentation to inform their decisions. Bruises are often difficult to identify due to a variety of factors, such as skin tone and age of injury. Additionally, bruise assessments by forensic clinicians provide little valid or reliable data about bruise ages beyond qualitative, subjective opinion. Across the lifespan, bruises are the most frequently reported soft-tissue injury suffered by survivors of violence. Also known as contusions, these injuries are caused by blunt, crushing, or squeezing force trauma to intact skin. Damaged blood vessels, typically within the dermal skin layer, leak red blood cells into the surrounding tissue creating an inflammatory response. The discoloration characteristic of bruising begins with hemoglobin from escaped red blood cells which generally has a red appearance. The color then changes over time as enzymatic processes breakdown the molecule, ultimately fading as the bruise resolves. Despite having a predictable healing process, many factors contribute to bruise appearance, such as body location, localized fat, medications and medical conditions, making direct estimation of bruise age and other characteristics solely based on bruise color difficult.

In addition to bruise detection, automated detection and evaluation of other skin features also presents difficulties. Specifically, features such as birth marks, scars, sun burns, moles, or other features of the skin can present differently depending on characteristics of an individual. The relationship between the severity and color of a sunburn, for example, may strongly depend on the underlying skin color of a patient. It is therefore necessary to develop a method which accounts for additional factors when imaging, detecting, and analyzing skin features.

Therefore, there is a long-felt but unresolved need for a system or process that detects and characterizes bruises, contusions, and other skin features objectively and accurately in view of patient-specific parameters.

BRIEF SUMMARY OF THE DISCLOSURE

Briefly described, and according to one embodiment, aspects of the present disclosure generally relate to systems and processes for automated skin feature detection and analysis, and more particularly to identifying and assessing the characteristics and age of skin contusions, bruises, and other similar skin features using a deep learning model.

Automated detection of skin features can be difficult due to intrinsic variability across patients (or other persons). Patients with different skin colors, ages, and medical histories can exhibit distinct pathophysiologies with respect to a variety of skin features, including bruises, contusions, sunburns, and other skin features. The present disclosure relates to methods for overcoming these challenges in an automated skin feature detection system.

At a high level, images of a person's (e.g., patient's) body part are captured via a digital camera with a light source. The parameters of the light source can be determined (e.g., specific wavelengths or filters) and used for later analysis. Other specific information about the image subject can be determined, including skin color, medical history and history of the injury. Images of an injured area can be combined with contextual clinical/health information as inputs to a machine learning model. The machine learning model can then detect and estimate characteristics of skin features. In an exemplary embodiment, the machine learning model detects bruises on the skin, and estimates their age and outputs the estimate to an end user along with a measurement of the uncertainty in the estimate.

As will be described in greater detail herein, aspects of the disclosed system relate to a skin feature (e.g., bruise) detection system including at least one data store configured to store images of body parts of one or more persons and at least one processor in communication with the data store. The at least one processor can retrieve an image of a body part of a person from the data store, the image comprising one or more predefined image parameters. The at least one processor can additionally receive health information corresponding to the person, detect a skin feature present in the image of the body part of the person, and apply a machine learning model to the image and the received health information to determine one or more characteristics of the skin feature.

In another aspect of the present disclosure, the one or more predefined image parameters comprise predetermined light wavelength parameters used to illuminate the body part of the person during image capture.

In an additional aspect of the present disclosure, the predetermined light wavelength parameters comprise wavelengths in a range of 395 nm-500 nm.

In an additional aspect of the present disclosure, the system further comprises an imaging device having a filter, wherein the image was captured using the imaging device, and wherein the filter blocks light having wavelengths of less than 500 nm.

In another aspect of the present disclosure, the at least one processor can, prior to applying the machine learning model to the image and the received health information, train the machine learning model. Training the machine learning model can further comprise obtaining a plurality of training images from the data store corresponding to observed skin features of a plurality of persons; associating one or more measured parameters with each of the plurality of training images, wherein the one or more measured parameters comprise at least measured light parameters and historical health information corresponding to each respective person of the plurality of persons; initializing model parameters for the machine learning model; applying the machine learning model to the plurality of training images to determine initial characteristics of the observed skin features; comparing the initial characteristics of the skin features to the one or more measured parameters to determine an efficacy of the machine learning model; and updating the model parameters of the machine learning model based on the comparison.

In another aspect of the present disclosure, the at least one processor can extract a feature vector from the image, and generate the one or more characteristics of the skin feature as a function of the feature vector and the received health information as applied to the machine learning model.

In another aspect of the present disclosure, the machine learning model can comprise an artificial neural network.

In another aspect of the present disclosure, the skin feature can comprise a bruise or skin contusion.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
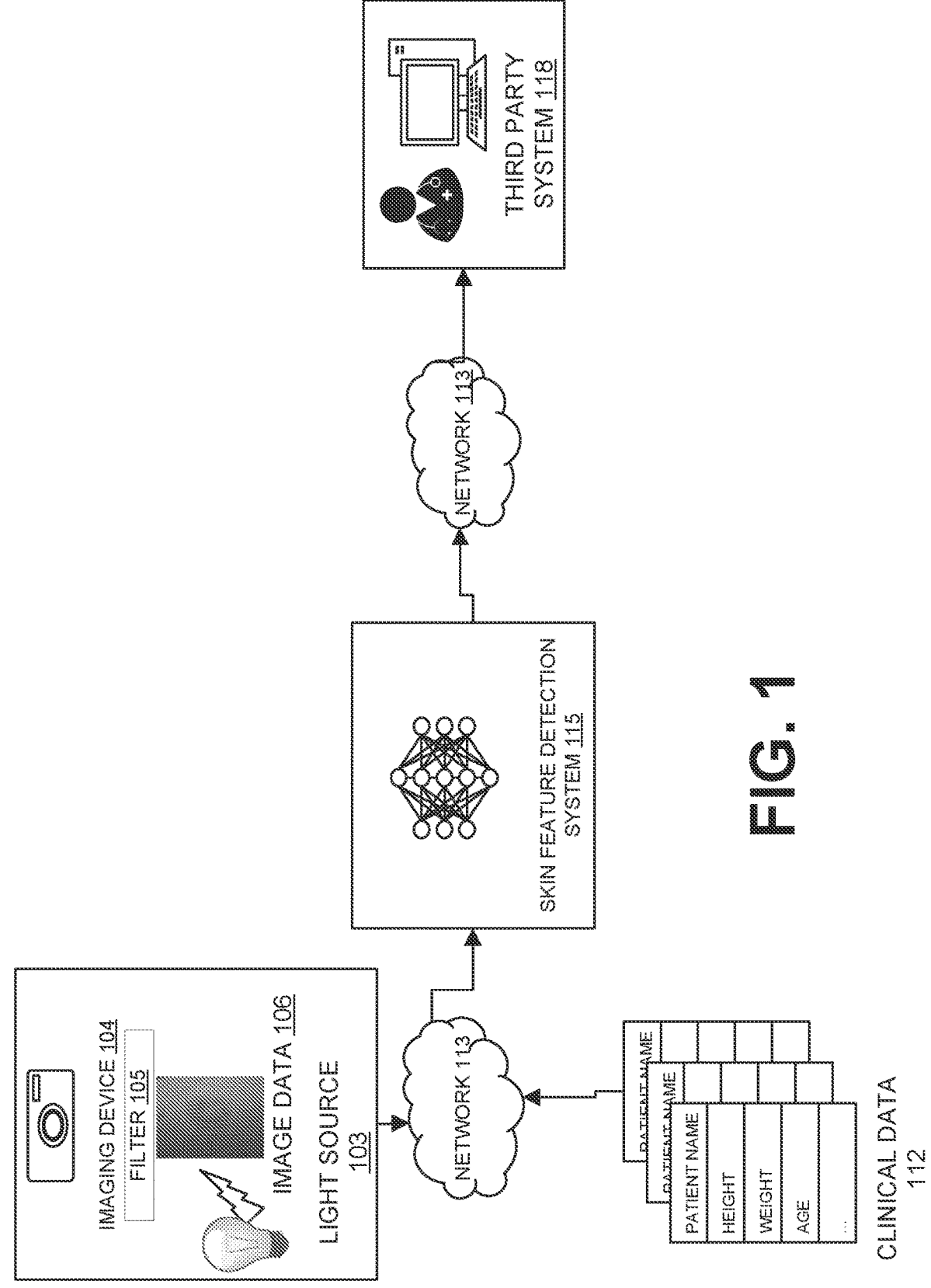
FIG. 1 illustrates an exemplary system for skin feature detection using a machine learning model according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

Aspects of the present disclosure generally relate to a system and method for bruise detection and characterization.

Automated detection of skin features can be difficult due to intrinsic variability across patients (or other persons). Patients with different skin colors, ages, and medical histories can exhibit distinct pathophysiologies with respect to a variety of skin features, including bruises, contusions, sunburns, and other skin features. The present disclosure relates to methods for overcoming these challenges in an automated skin feature detection system.

At a high level, images of a person's (e.g., patient's) body part are captured via a digital camera with a light source and a camera filter. The parameters of the light source (e.g., specific wavelengths or filters) can be determined and used for later analysis. Other specific information about the image subject can be determined, including skin color and medical history. Images of an injured area can be combined with contextual clinical information as inputs to a machine learning model. The machine learning model can then detect and estimate characteristics of skin features. In an exemplary embodiment, the machine learning model detects bruises on the skin, and estimates their age and outputs the estimate to an end user along with a measurement of the uncertainty in the estimate.

For purposes of illustration and example, the present disclosure shall generally refer to skin features comprising bruises or contusions (i.e., detecting and analyzing bruises or contusions of the skin), as these types of skin features have a pressing need for analysis in various contexts. The present disclosure should not, however, be interpreted as being limited only to bruises or contusions, and instead can apply to identifying and analyzing any other relevant skin features, including but not limited to rashes, birthmarks, sunburns, skin diseases (such as eczema or psoriasis), or other similar skin features. Thus, any reference to bruises or skin contusions herein shall be for example only and representative of only a handful of possible embodiments of the present disclosure.

The present disclosure shall also often refer to use of the present systems and methods with "patients," including persons that have suffered physical injury in connection with domestic abuse, trauma, or other similar health events. It should be understood and appreciated, however, that aspects of the present systems and methods can be used in any context in which one desires to analyze the skin feature of a person, and the systems and methods are not limited only to a healthcare setting.

Example Embodiments

Referring now to the figures, for the purposes of example and explanation of the fundamental processes and components of the disclosed systems and processes, reference is made to FIG. 1, which illustrates an exemplary, high-level overview of one embodiment of the skin feature detection system 115. As will be understood and appreciated, the exemplary, high-level overview shown in FIG. 1 represents merely one approach or embodiment of the present system, and other aspects are used according to various embodiments of the present system. Further, as mentioned above and for illustrative purposes only, the present systems and methods shall be discussed herein in the context of bruise or contusion detection and analysis.

As depicted in FIG. 1, the skin feature detection system 100 can include an imaging device 104 for capturing images of skin features. The imaging device 104 can include a light source 103 which illuminates the imaged area. The light source 103 can be white light. The light source 103 can alternatively be a light emitting diode (LED), laser, or other suitable light source which restricts emitted light to a particular wavelength band. The light source 103 can be embedded in or a part of the imaging device 104, or it can be a separate device altogether. The imaging device 104 can include a filter 105 which restricts the wavelengths of reflected light which pass through.

Different wavelengths of light source 103 or filters 105 of imaging device 104 can be interchangeable based on an optimal set of imaging parameters. The optimal set of imaging parameters can be determined at the point of care based on specific characteristics of the patient. Such characteristics can include the patient's skin color and medical history and other relevant features that may dictate the need for certain wavelengths. As an example, patients with darker skin colors will have different color characteristics for bruises when compared with patients with lighter skin colors. Adjusting the illumination parameters such that the image achieves maximum contrast between imaged bruise color and background skin color can enhance the ability for an automated method to both identify and analyze the characteristics of a bruise. As such, patients with darker skin colors may benefit from the use of a light source of one wavelength, while patients with lighter skin colors may benefit from the use of a light source of a different wavelength. In one non-limiting example, the wavelengths used for image capture are between about 395 nm-500 nm (nm=nanometers).

The imaging device 104 can be a digital camera. The imaging device 104 can additionally reside on a mobile device. The imaging device 104 can capture image data 106 in a color format or in grayscale. The imaging device 104 can be configured to capture one or more images at a time. The imaging device 104 can alternatively be configured to capture videos.

In one embodiment, the imaging device 104 is a digital camera resident on a mobile phone, wherein the user places a filter 105 on the camera lens which restricts reflected wavelengths of light to those greater than 500 nm. The light source 103 can be an LED which emits 450 nm light to illuminate the imaged area. An exemplary embodiment of the illumination and imaging apparatus is discussed in greater detail with reference to FIG. 7 below.

The imaging system 101 can be communicatively coupled to a computing system containing a skin feature detection system 115 via a network 113.

The bruise detection system can further include clinical data 112. Clinical data 112 can be collected at a point of care by a medical service provider. Clinical data 112 can alternatively be self-reported by a patient, retrieved from an electronic health record or other historical medical record, retrieved from a law enforcement record, or obtained in any other suitable fashion. Clinical data 112 can be in coded, textual or other format. Clinical data 112 can include personal and medical information. Personal information can include a patient name, a patient age, a patient height, a patient weight, a patient race or ethnicity, and other pertinent personal information. Medical information can include disease history information, allergy information, medication information, specific injury information, or other similar types of information. Additional clinical can include known history of the injury and prior injuries, suspected source of injury.

As shown in FIG. 1, clinical data 112 and image data 106 can be ingested via a network interface into a skin feature detection system 115 which is resident on a computing device. The skin feature detection system 115 can include a machine learning model. The skin feature detection system 115 can include one or more artificial neural networks (ANNs). Suitable neural networks can be in the class of convolutional neural networks (CNNs), including recurrent neural networks (RNN) and long short term memory (LSTM) networks. ANNs used in the detection and analysis of skin features can include attention mechanisms to better emphasize particular aspects of the data input and improve model interpretability and explainability.

In an exemplary embodiment, the skin feature detection model consists of two or more parallel CNNs, one which detects skin features in images captured in ambient light, and another which detects skin features in images captured under an alternate light source of a specified wavelength, with additional networks configured to analyze images captured under light sources of additional wavelengths.

The skin feature detection system 115 can be configured to combine image data 106 and clinical data 112 prior to detecting a bruise. The skin feature detection system 115 can further be configured to estimate bruise parameters. Bruise parameters can include a bruise size, a bruise age, an amount of force which caused a bruise, or other relevant information about a bruise. The skin feature detection system 115 can be communicatively coupled to a third party system 118 by the network 113.

The third party system 118 can be a display system configured to display the one or more outputs of the skin feature detection system 115 to a healthcare provider. Alternatively, the third party system 118 can be a patient healthcare portal, configured to allow patients to access the outputs of the skin feature detection system 115. The third party system 118 can include a database of de-identified bruise images and their estimated parameters. The third party system 118 can be accessible via the internet.

In an exemplary embodiment, the third party system 118 includes a user interface, which provides the ability for clinicians, patients, law enforcement, and other relevant individuals to visualize the outputs of the skin feature detection model. The user interface can allow users to visualize the spatial extent of the bruise, as well as estimates of bruise parameters. Further, the third party system 118 can be configured to show de-identified similar injuries and subject histories based on similar cases stored in a database. The third party system 118 can allow user interaction to correct inaccuracies of the skin feature detection model 115.

Figure 2:
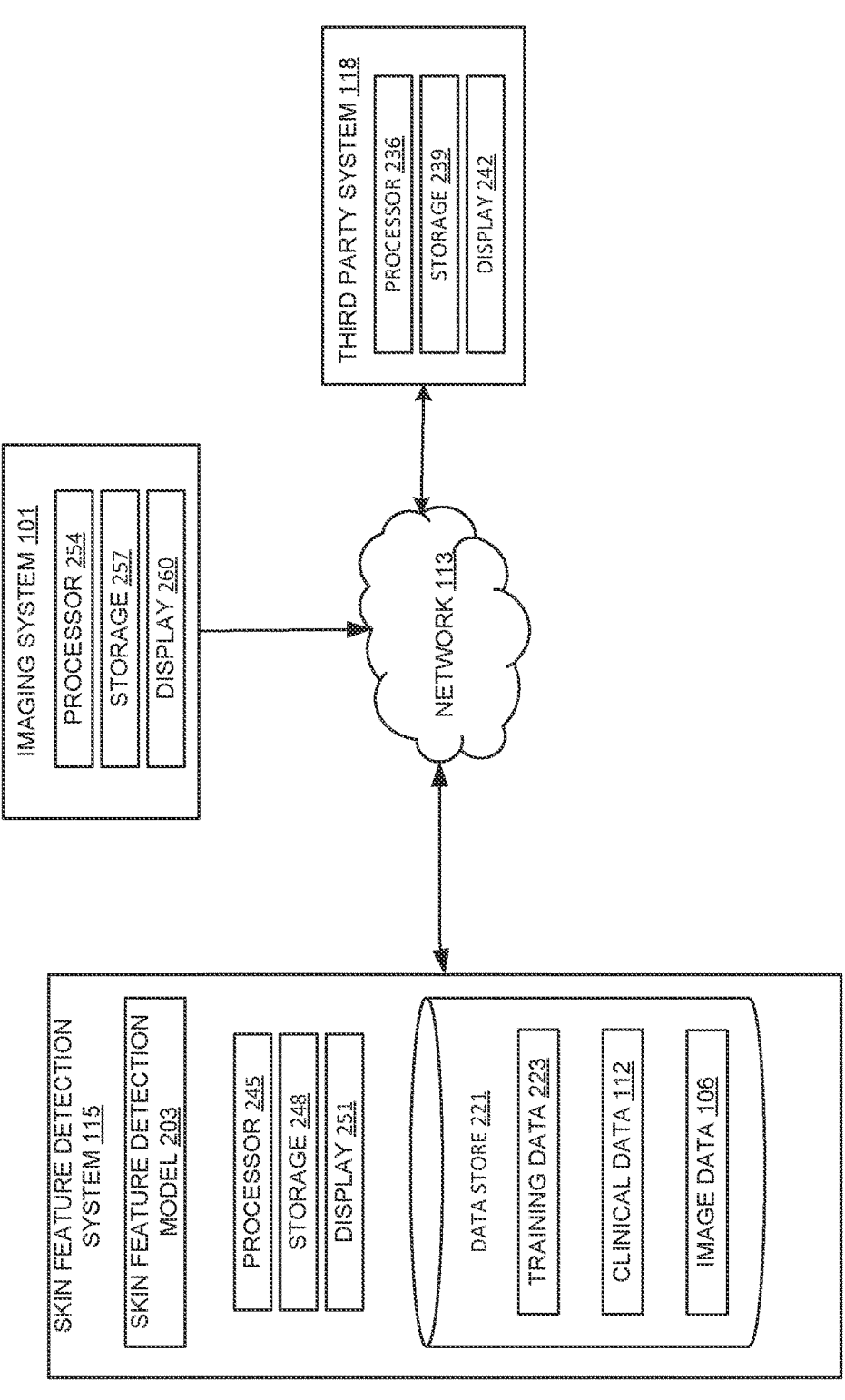
FIG. 2 illustrates an exemplary networked environment according to various embodiments of the present disclosure.

Referring now to FIG. 2, in an exemplary embodiment, the skin feature detection system can include a skin feature detection model 203. Further, the skin feature detection system 115 can have a data store 221. The data store 221 can store multiple data types. For example, the data store 221 can store training data 223, clinical data 112, and image data 106. The data store 221 can be transitory or non-transitory.

The data store 221 can be local to the skin feature detection system 115 or communicatively coupled to the skin feature detection system 115 via a network.

The skin feature detection system 115 can be communicatively coupled to the imaging device 104 and the third party system 118 by a network 113. The third party system 118 can include a processor 236, a storage device 239, and a display 242. The imaging device 104 can include a processor 254, a storage 257, and a display 260.

Figure 3:
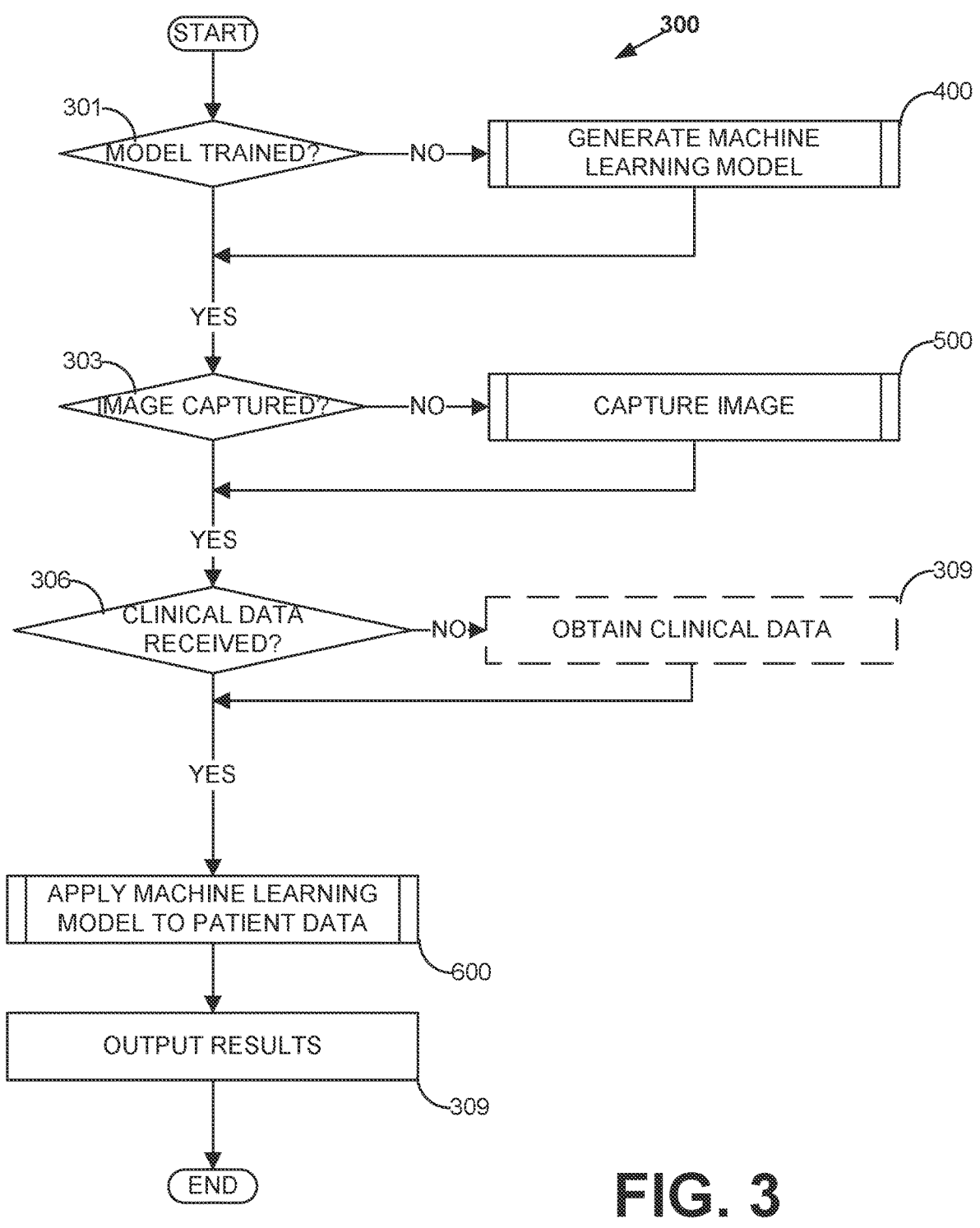
FIG. 3 illustrates an exemplary overall process for the disclosed system according to various embodiments of the present disclosure.

As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown.

FIG. 3 depicts an exemplary overall process 300 for operation of the skin feature detection system 115. At step 301, the system determines whether the skin feature detection model 203 has been trained. The system can evaluate the current accuracy of the model relative to a predetermined threshold in order to make this determination. For example, if the model as instantiated detects 95% of bruises correctly, it can be determined that the model has been trained, and is ready to receive clinically relevant inputs.

If the model has not been trained, or if the accuracy threshold is not sufficient, the system moves to the machine learning model generation process 400 (to be discussed in greater detail in connection with FIG. 4). In brief, the machine learning model generation process 400 is a process by which a curated training dataset is used to generate an accurate machine learning model. The curated training dataset can include images from a variety of sources labeled with a variety of bruise parameters (further detailed below).

If the model has been trained, the system moves to step 303, wherein the system determines whether an image has been received to be analyzed. If no image has been received, the system proceeds to the image capture process 500 (to be discussed in greater detail in connection with FIG. 5). In brief, the image capture process 500 is a process by which imaging parameters are selected based on patient features, and one or more images of an injured area are captured.

Once an image has been captured, the system can determine whether additional clinical information has been provided as an input. If no clinical information has been obtained, the system can optionally obtain additional clinical information 112 at step 309. Clinical information can be obtained by a healthcare provider, a law enforcement officer, or by retrieval from an electronic records system. Additional clinical information can be useful in providing context to clinicians. Further, clinical information can be used to adjust the parameters of the skin feature detection model as described in connection with FIG. 6.

Next, the system proceeds to apply the trained machine learning model to the acquired patient data (including an image of a skin feature) in process 600 (to be discussed in greater detail in connection with FIG. 6). In brief, applying the trained machine learning model to acquired patient data comprises compiling the total set of inputs, providing them to the model, and receiving outputs from the model. The integral steps in the above outlined processes 400, 500, and 600 will now be described in detail with reference to FIGS. 4-6.

Figure 4:
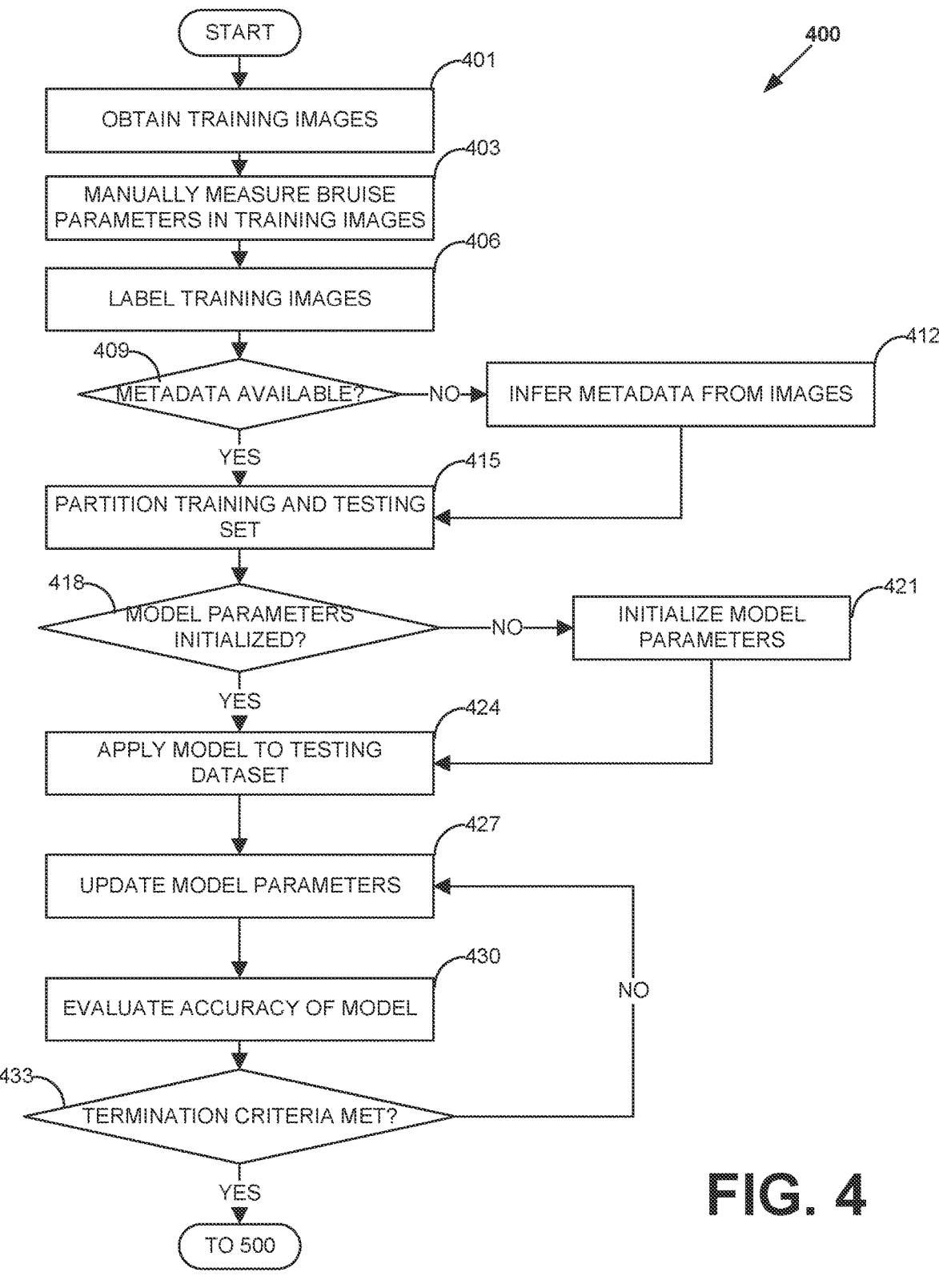
FIG. 4 illustrates an exemplary process for machine learning model generation according to various embodiments of the present disclosure.

Referring now to FIG. 4, depicted is an exemplary machine learning model generation process 400. At step 401, the bruise detection model 115 can obtain training images. In a machine learning model for image analysis, training images are generally images which represent the space of potential inputs to the model. Training images are accompanied with "ground truth" labels, typically provided by expert assessment. Such images are used to train the model by comparing model outputs to the expert "ground truth" assessments to ensure model accuracy. In the context of bruise detection, training images can include a large database of images of bruises of various shapes, sizes, and degrees, wherein the outline of the bruise has been manually segmented by a trained professional. Further, the training images can be accompanied with a series of labels which identify measured bruise parameters. In an exemplary embodiment, training images include an image of a bruise, a manually segmented bruise region, a measured bruise size, a measured bruise age, an estimate of force used to cause a bruise, and an estimate of the strength or degree of the injury, as well as other relevant parameters.

Training images can be obtained according to image capture process 500 (described further in reference to FIG. 5 below). Training images can be captured according to a wide array of image capture parameters. For example, the imaging system 101 used to capture training images can be different for different training images. Training images can be captured using ambient (white) light or an alternative light source of a specified wavelength. Alternatively, training images can be obtained from a preexisting database or can be scraped from the internet. In an exemplary embodiment, training images are a combination of clinical images, crowd sourced images, and images taken under controlled conditions which are stored in a proprietary online database. The training data set can be configured to include as many combinations of imaging and bruise parameters expected to be seen by the model in practical use.

At step 403, bruise parameters are extracted from training images. Bruise parameters can include a length, width, or area of a bruise, a color of a bruise, a shape of a bruise, and an age of a bruise, among other types of factors or parameters. Bruise size parameters can be manually measured by a healthcare provider. Alternatively, bruise size parameters can be algorithmically estimated using preexisting software. Bruise color parameters can be measured by comparing to reference colors or using a spectrophotometer, chromameter, colorimeter, or other suitable color sensing devices. Alternatively, bruise color parameters can be estimated using preexisting software.

Bruise age parameters can be estimated using preexisting methods known in the art, or by self-reporting of the patient. Specifically, bruise age can be estimated by forensic clinicians based on the color, size, and extent of the identified bruise in association with known features of typical bruise pathophysiology. Bruise age estimates can be given as a range (e.g., 10-14 days), with larger ranges indicating greater uncertainty in the estimate. In some cases, bruise age estimates can be confirmed in the context of controlled experiments, wherein bruises are induced in a controlled setting via the application of a known force at a known time, and at a later date, clinicians are asked to estimate the age of the bruise. In an exemplary embodiment, training data can include both data with known bruise ages based on controlled bruise induction and data with estimated bruise age ranges and associated uncertainty from real-world applications.

At step 406, training images can be associated with labels which include the relevant parameters extracted in step 403. These labels can be used for model training. Specifically, the model can be configured to minimize a difference between the outputs of the model for a particular image and the image's corresponding labels. For example, a training image of a bruise labeled with an age estimate 10-14 days should, when used as an input to the trained model, elicit a corresponding estimate of 10-14 days. If the output of the model indicates an estimated age of, for example, 20 days, this is an error of at least 6 days that indicates that the model parameters may need to be adjusted. Similar difference metrics can be used to evaluate model performance with respect to other labeled features, such as bruise size, shape, cause, strength, or other relevant features.

At step 409, the system can determine whether additional metadata is available for the training images. Additional metadata can include information about image quality, reliability, image source, light source, or other information about image capture. Metadata corresponding to the context in which images were captured can be useful in further adjusting the parameters of the bruise detection model. As an example, if metadata indicates that the bruise image was captured in low-light conditions, color thresholds for a detected bruise may be different from those expected for a bruise image captured under bright light. If such metadata is directly associated with the training images, it can be included as an input to the model.

If metadata is not directly available from training images, at step 412, metadata can be inferred from the training images. Metadata inference can be accomplished using known image processing techniques such as thresholding and histogram equalization. As an example, an overall luminance level for a training image can be estimated based on the distribution of pixel values in that image. The estimated luminance value can then be associated with the training image and used as an additional input to the model.

At step 415, the training data can be partitioned into a training set and a testing set. The partitioning of the training and testing data can be done at random. The partition can be any ratio of training to testing data, (e.g., 80% training, 20% testing data). The testing data can be decoupled from its labels to facilitate model performance testing. In an exemplary embodiment, the partitioning of training data into training and validation sets can be repeated a predetermined number of times (e.g., 10 times) in a process known as cross-validation. In an exemplary embodiment, manifold learning can be applied to the training set to generate a low-dimensional representation of training images which will be used to estimate parameters of testing images.

At step 418, the system can determine whether a set of model parameters have been initialized. Model parameters can include an architecture of an artificial neural network, a number of neurons in an artificial neural network, a number of layers in an artificial neural network, or a set of weights in an artificial neural network. If model parameters have not been initialized, the system can initialize model parameters at step 421. Initial model parameters can be selected at random or can be selected according to predictive estimates of the appropriate parameters.

Model parameters can be selected based on desired accuracy metrics. Accuracy metrics can include receiver operator characteristic (ROC) curves, confusion matrices, false positive and negative rates, predictive accuracy, F-1 scores, calibration metrics, decision curves, and other suitable metrics. Accuracy metrics can be calculated for entire testing dataset to its subsets (i.e., only images with specific skin color). Model parameter initialization can include taking general purpose image classification models optimized according to the above metrics, and adjusting them to maximize accuracy in the context of bruise parameter estimation.

Model parameters may also be selected according to their computational complexity. As an example, RNNs with more neurons require significantly more computational power for training and execution. If a smaller or less complicated network can be used at a similar level of accuracy, it is beneficial in terms of cost, and speed of diagnosis for the patient.

At step 424, after initializing model parameters, the system can apply the model to the testing dataset. The particular steps of applying the machine learning model to unlabeled data are outlined in the discussion of FIG. 6 below. Briefly, image data and other contextual information is provided to the model as inputs, and the model outputs a series of estimates. The outputs of the model can be bruise parameters. Bruise parameters can include age, size, severity, force and other bruise parameters. The model can output measures of likely ranges or uncertainty of the estimated bruise parameters.

At step 427, the system can iteratively update the parameters of the model based on the outputs obtained at step 424. Updated parameter values can be determined by comparing estimated bruise parameters to true parameters contained in the labels of the training data. At step 430, the system can evaluate the accuracy of the machine learning model. The evaluated accuracy can be compared to a set of termination criteria at step 433. The termination criteria can be a minimum accuracy level, a maximum number of iterations, a reliability metric, or other suitable criteria. If the termination criteria are not met, the system can return to step 427 and update the model parameters once again. Once the termination criteria has been reached, the model has been trained and is ready for receiving inputs. As an example, for bruise detection, at each iteration of training, the model may compute an area under an ROC curve to determine the accuracy of bruise detection. The iterative model update process can be terminated when the area under to ROC curve reaches a threshold value (e.g., 0.95). For bruise estimation, a mean squared error between estimated bruise age and true age can be minimized using gradient descent approaches. Similar approaches can be used for estimation of additional bruise parameters.

The training procedure can additionally include network regularization methods which reduce the possibility of overfitting. One such method is dropout, in which the network is forced to maintain accuracy when individual neurons are artificially "deleted" from the network at random. This reduces the probability of overfitting by ensuring that individual neurons in the network do not simply encode individual inputs in the training set.

Figure 5:
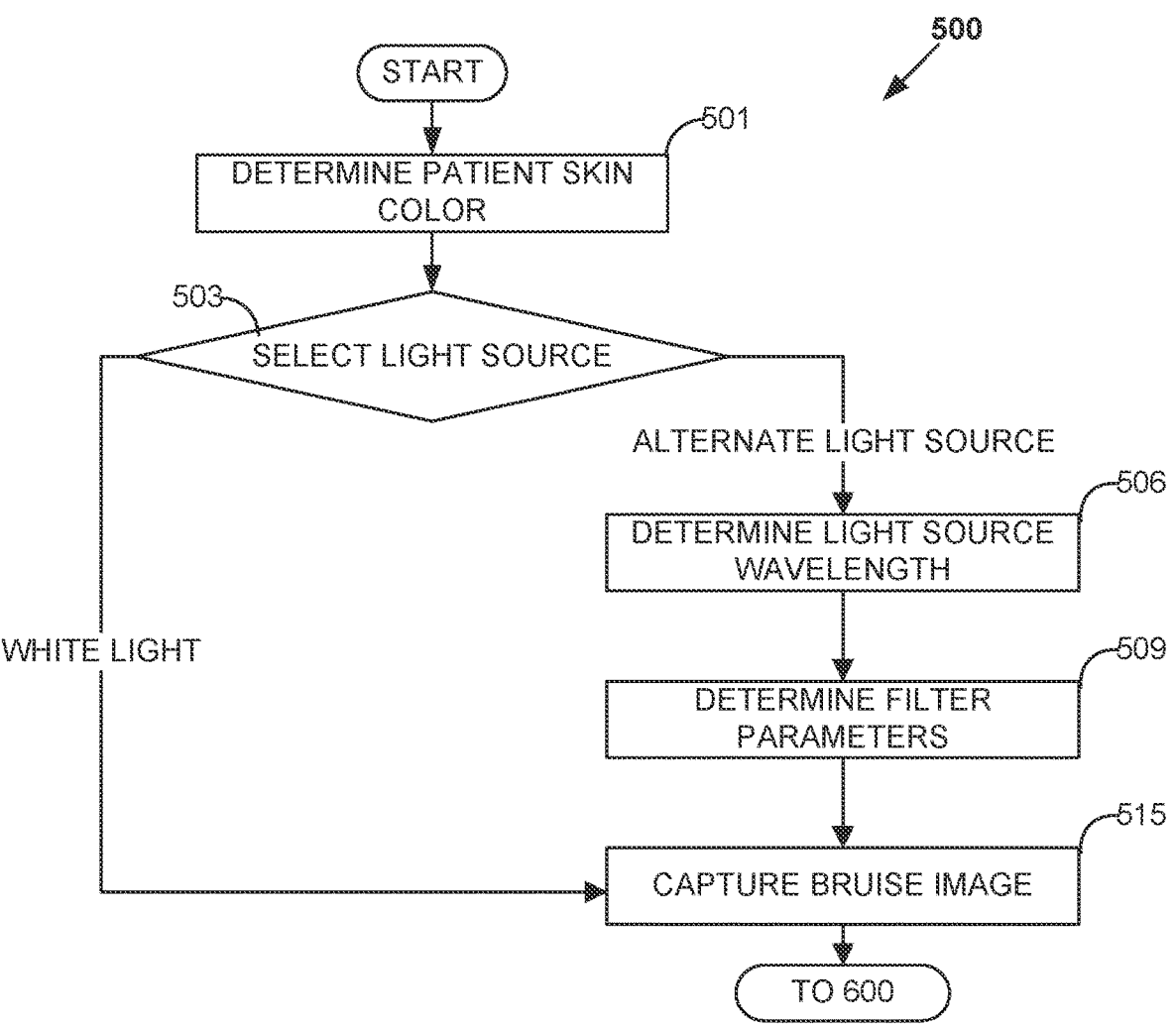
FIG. 5 illustrates an exemplary process for image capture according to various embodiments of the present disclosure.

Referring now to FIG. 5, depicted is an exemplary image capture process 500. At step 501, the system can determine a skin color of the patient. Skin color can be determined using a standardized scale or a specific color measurement device (e.g., a spectrophotometer). Optimally, skin color should be estimated based on a non-injured portion of the patient's skin nearby the target image area. Even within patients, skin color can vary across different parts of the body. To achieve an accurate estimate of the skin color at the injury site, it is therefore essential to measure the skin color as close as possible to the injured site without contaminating the measurement with the injured area.

At step 503, the light source can be selected to either be white (ambient or visible) light or an alternate light source. White light may be selected in environments without access to specialized light sources of particular wavelengths. White light can include any combination of fluorescent, incandescent, or natural light available in the imaging setting. As will be understood by those skilled in the art, white light can include wavelengths of light both inside and outside of the visible light spectrum (e.g., ultraviolet or infrared light). As described previously, alternate light source illumination with a wavelength determined according to patient-specific features can be used to improve the accuracy of skin feature detection.

Figure 7:
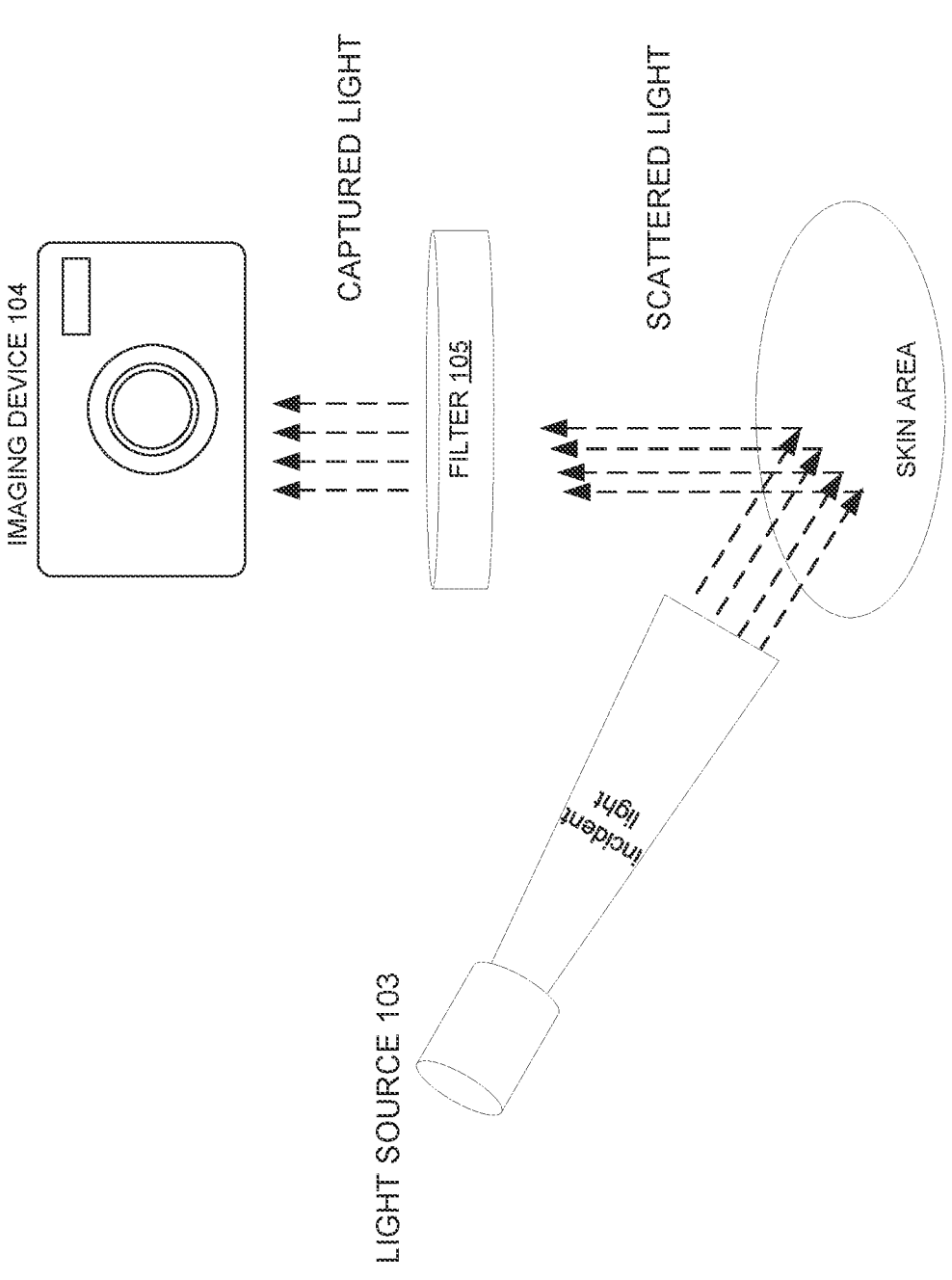
FIG. 7 illustrates an exemplary embodiment of an illumination and image capture setup according to various embodiments of the present disclosure.

At step 506, the system can, based on the determined skin color, determine a wavelength of the light source 103 to be used to illuminate the bruise. Such a determination can be made according to a lookup table. For example, patients with skin color in a predetermined range may correspond to an optimal illumination wavelength of 450 nm. At step 509, the system can, based on the detected patient skin color and the determined wavelength of the light source, determine a set of filter parameters. The filter parameters can be configured to further limit the wavelengths of light captured by the imaging device. For example, if the determined skin color of the patient indicates that the optimal wavelength of light for imaging is 500 nm or greater, a filter can be selected which eliminates ambient light generally outside of this wavelength band. FIG. 7, described in greater detail below, illustrates one possible embodiment of an image capture system using an external filter.

In the absence of an alternate light source, steps 506-509 may be unnecessary, as they are directed towards selecting the parameters of the alternate light source.

At step 515, the system can capture an image of the bruise. The system can capture more than one image of the bruise, or a series of frames in a video format. The system can capture multiple images of the bruise from the same angle, or multiple images of the bruise from multiple angles. The system can capture multiple images of the bruise according to multiple sets of illumination parameters. For example, the system can capture 10 images of the bruise with 10 different combinations of light source and filter parameters. While potentially cumbersome in a clinical setting, collecting data across the entire spectrum of potential illumination wavelengths can help further characterize the effects of illumination parameters on bruise detection and characterization capabilities. As will be understood, any number of images of a possible bruise site can be captured to enhance the accuracy of the end outputs. Following image capture, the captured data is provided as an input into the trained machine learning model according to process 600 described below in reference to FIG. 6.

Figure 6:
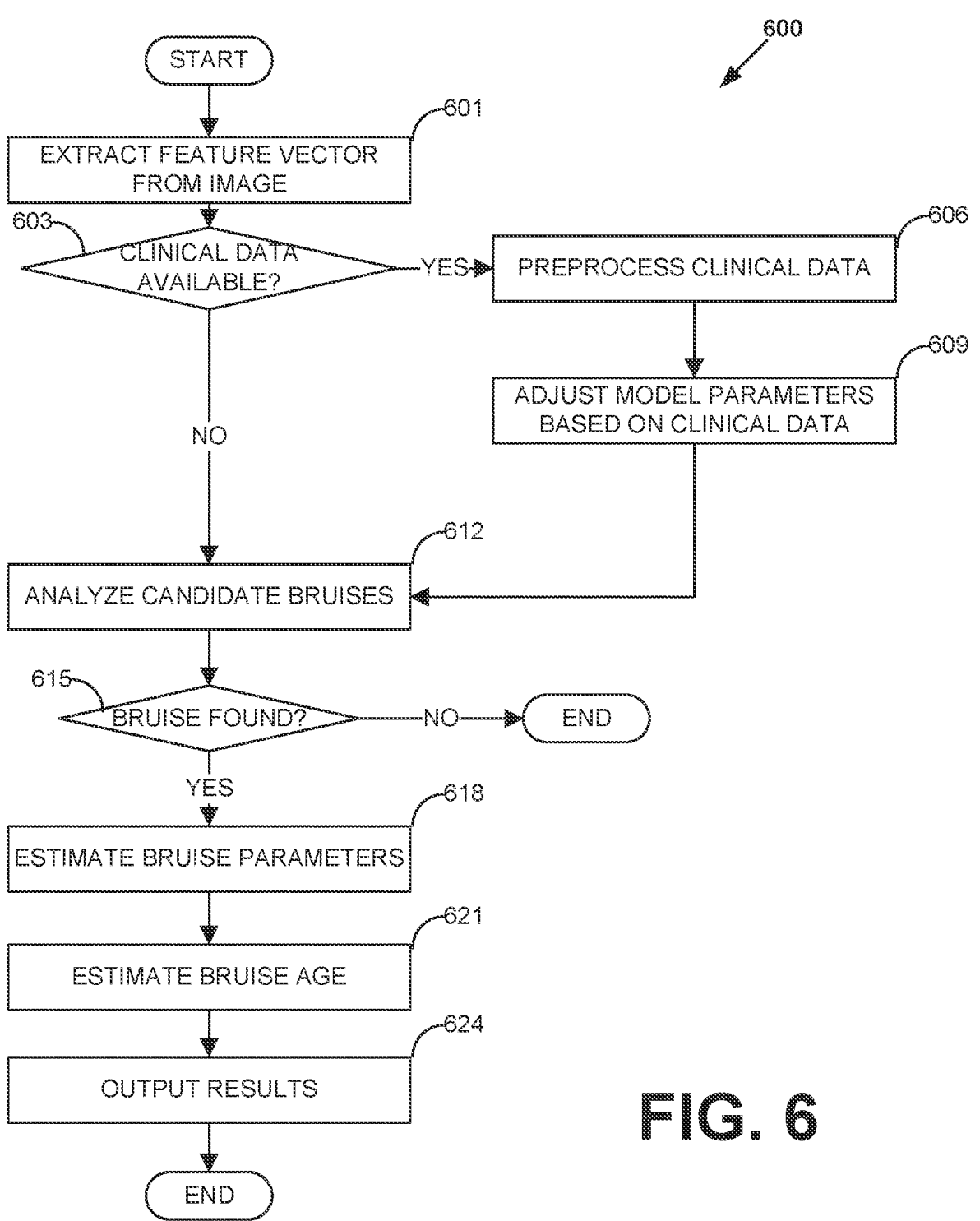
FIG. 6 illustrates an exemplary process for image analysis according to various embodiments of the present disclosure.

FIG. 6 depicts an exemplary process 600 for applying a trained machine learning model to patient data. At step 601, a feature vector can be extracted from the image. The feature vector can be extracted according to a dimensionality reduction technique, or a manifold embedding technique. In one embodiment, the feature vector extraction process generates a single data point from an image or set of images which can be used to compare to known data points to estimate parameters. For example, by embedding the input image data into a low dimensional manifold which contains all of the training data, it becomes straightforward to identify the nearest data point in the training data set to use as an estimator for variables of interest.

At step 603, the system can determine whether additional clinical data 112 is available to be associated with an input image. If clinical data 112 is available, it can be processed at step 606. Preprocessing of clinical data 112 can include normalization, a linear combination of numerical parameters, quantification of categorical variables, and other preprocessing steps. As previously described, additional clinical data can provide context to an image which is vital for the accurate estimation of bruise parameters. Preprocessed clinical data can be appended to the feature vector generated in step 601.

At step 609, the system can adjust model parameters based on obtained clinical data 112. Adjusting the model parameters based on clinical data can include adjusting weights based on medical information. For example, if clinical data 112 indicates that the patient has a blood disorder that would alter the parameters of a detected bruise, the model weights can be adjusted accordingly.

At step 612, the machine learning model can identify candidate bruises in the image. The model can compare the feature vector generated at step 601 with known feature vectors from the training dataset. Feature vector similarity between the input image and training data may indicate similarity in bruise parameters. A threshold can be applied to a comparison between these feature vectors to make a determination as to the presence or absence of a bruise. For example, if a data point from the training set which contains a bruise exhibits greater than 90% similarity with the input data point, the system can conclude that a bruise is present. At step 615, the system can make the determination as to the presence or absence of a bruise in the image. If there is no bruise in the image, the process 600 can end, and no further analysis is needed. If there is a bruise in the image, the system can further estimate bruise parameters at step 618. Bruise parameters can include an amount of force, bruise color, bruise size, or bruise shape. As before, bruise parameters can be estimated based on similarity between feature vectors. As an example, if two training images contain bruises of area 4 cm$^2$ and 8 cm$^2$, and the feature vector for the input bruise lies exactly between the feature vectors of the two training images, the bruise size can be estimated to be 6 cm$^2$. It should also be noted that the entire feature vector characterization and output estimation process can occur within the machine learning model without additional user input.

At step 621, the system can estimate the age of the bruise. The bruise age can be estimated as an exact age or as a range (e.g., less than 12 hours, between 2 and 10 days, less than 15 days, more than 20 days). The bruise age can be estimated based on the color of the bruise, the shape of the bruise, and other measured or estimated parameters. Again, similarity between feature vectors in the input image and training data can be used to estimate the bruise age. At step 624, the results can be output to third party system 118 to be used by a healthcare provider, forensic analyst, law enforcement officer, or other individual.

Referring now to FIG. 7, depicted is an exemplary embodiment of an illumination and image capture setup. As show, light source 103 is configured to illuminate a skin area of interest with light of a particular wavelength. The wavelength of the light source can be, for example, 395-500 nm. Light from the light source 103 impinges upon the skin area, at which point the light is scattered. Scattered light can exhibit a shift in wavelength. Scattered light can pass through a filter 105. The filter 105 can be a long-pass filter with a cutoff wavelength of, for example, 500 nm. Such a filter would eliminate scattered light of wavelengths less than 500 nm. The imaging device 104 can be positioned downstream from the filter 105, such that it captures filtered light scattered from the skin area of interest. In certain embodiments, a filter 105 is unnecessary (e.g., if a particular light source with tunable wavelengths is used). In other embodiments, the filter 105 is used to ensure a specific wavelength band of light is received by the imaging device 104.

The present systems and methods can make use of various combinations of (1) spectral compositions (wavelengths) and intensities of incident light; and (2) spectral compositions (wavelengths) and intensities of the light captured by the imaging device 104. For example, the incident light can have an incident-light-spectrum (having a certain wavelength spectral-range) determined by the type of light source and other optical elements (e.g., filters) in the incident light beam. Light captured by an imaging device 104 can have a spectral composition determined by one or more filters 105 (e.g., transmission spectrum of the filter) placed in the path of the scattered light. Further, the spectral composition of the captured light can be affected by the imaging device's spectral response and the spectral composition of the scattered light itself.

To illustrate further, in a specific, non-limiting example, assume that an alternative light source emits light at about 450 nm. The light hits the subject's/patient's skin and bounces back towards the imaging device 104. When the light bounces, however, it does so in a variety of wavelengths, and the wavelength shifting is generally different for bruised skin than for unbruised skin. This difference in shifted wavelengths is one input into the neural network or machine learning model to help identify skin features. Thus, in this example, the filter 105 can be used to block 450 nm light from the imaging device 104 and instead only pass the shifted light to the imaging device for image capture. Said differently, the filter serves as an amplifier for the captured image and thus improves the accuracy of the resulting machine learning model.

As will be understood, the specific parameters of the imaging setup, specifically the wavelength of the light source 103, and the features of the filter 105 can vary according to the optimal parameters for a particular application, based on patient features as described above. Embodiments are not limited to any particular range of wavelengths for the incident light or the captured light. The system in general is configured to illuminate a skin feature with a light source with particular spectral characteristics, and capture scattered light with potentially different spectral characteristics with an imaging device 104. The difference in spectral characteristics is one data factor that impacts the configuration and efficacy of the skin feature detection model 115 (i.e., skin exhibiting a skin feature, such as a bruise or contusion, may illicit light with a different spectral characteristic than the source light).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A method for skin feature detection and analysis, comprising:

receiving an image of a body part of a person, the image comprising one or more predefined image parameters;

receiving health information corresponding to the person;

detecting a skin feature present in the image of the body part of the person;

training a machine learning model, wherein training the machine learning model comprises:

obtaining a plurality of training images corresponding to observed skin features of a plurality of persons;

associating one or more measured parameters with each of the plurality of training images, wherein the one or more measured parameters comprise at least measured light parameters and historical health information corresponding to each respective person of the plurality of persons;

initializing model parameters for the machine learning model;

applying the machine learning model to the plurality of training images to determine initial characteristics of the observed skin features;

comparing the initial characteristics of the skin features to the one or more measured parameters to determine an efficacy of the machine learning model; and updating the model parameters of the machine learning model based on the comparison; and applying the machine learning model to the image and the received health information to determine one or more characteristics of the skin feature.

2. The method of claim 1, wherein the one or more predefined image parameters comprise predetermined light wavelength parameters used to illuminate the body part of the person during image capture.

3. The method of claim 2, wherein the predetermined light wavelength parameters comprise wavelengths in a range of 395 nm-500 nm.

4. The method of claim 1, wherein the image was captured using an imaging device having a filter, wherein the filter blocks light having wavelengths of less than 500 nm.

5. The method of claim 1, wherein applying the machine learning model to the image and the received health information further comprises:

extracting a feature vector from the image; and generating the one or more characteristics of the skin feature as a function of the feature vector and the received health information as applied to the machine learning model.

6. The method of claim 1, wherein the machine learning model comprises an artificial neural network.

7. The method of claim 1, wherein the skin feature comprises a bruise or skin contusion.

8. A system for skin feature detection and analysis, comprising:

a data store configured to store images of body parts of one or more persons; and at least one processor in communication with the data store, the at least one processor being configured to:

retrieve an image of a body part of a person from the data store, the image comprising one or more predefined image parameters;

receive health information corresponding to the person;

detect a skin feature present in the image of the body part of the person;

train the machine learning model, wherein training the machine learning model comprises:

obtaining a plurality of training images from the data store corresponding to observed skin features of a plurality of persons;

associating one or more measured parameters with each of the plurality of training images, wherein the one or more measured parameters comprise at least measured light parameters and historical health information corresponding to each respective person of the plurality of persons;

initializing model parameters for the machine learning model;

applying the machine learning model to the plurality of training images to determine initial characteristics of the observed skin features;

comparing the initial characteristics of the skin features to the one or more measured parameters to determine an efficacy of the machine learning model; and updating the model parameters of the machine learning model based on the comparison; and apply the machine learning model to the image and the received health information to determine one or more characteristics of the skin feature.

9. The system of claim 8, wherein the one or more predefined image parameters comprise predetermined light wavelength parameters used to illuminate the body part of the person during image capture.

10. The system of claim 9, wherein the predetermined light wavelength parameters comprise wavelengths in a range of 395 nm-500 nm.

11. The system of claim 8, further comprising an imaging device having a filter, wherein the image was captured using the imaging device, and wherein the filter blocks light having wavelengths of less than 500 nm.

12. The system of claim 8, wherein the at least one processor is further configured to:

extract a feature vector from the image; and generate the one or more characteristics of the skin feature as a function of the feature vector and the received health information as applied to the machine learning model.

13. The system of claim 8, wherein the machine learning model comprises an artificial neural network.

14. The system of claim 8, wherein the skin feature comprises a bruise or skin contusion.

15. A non-transitory computer-readable medium embodying a program that, when executed by at least one processor, causes the at least one processor to:

receive an image of a body part of a person, the image comprising one or more predefined image parameters;

receive health information corresponding to the person;

detect a skin feature present in the image of the body part of the person;

train the machine learning model, wherein training the machine learning model comprises:

obtaining a plurality of training images corresponding to observed skin features of a plurality of persons;

associating one or more measured parameters with each of the plurality of training images, wherein the one or more measured parameters comprise at least measured light parameters and historical health information corresponding to each respective person of the plurality of persons;

initializing model parameters for the machine learning model;

applying the machine learning model to the plurality of training images to determine initial characteristics of the observed skin features;

comparing the initial characteristics of the skin features to the one or more measured parameters to determine an efficacy of the machine learning model; and updating the model parameters of the machine learning model based on the comparison; and apply the machine learning model to the image and the received health information to determine one or more characteristics of the skin feature.

16. The non-transitory computer-readable medium of claim 15, wherein the one or more predefined image parameters comprise predetermined light wavelength parameters used to illuminate the body part of the person during image capture, and wherein the image was captured using an imaging device having a filter, wherein the filter blocks light having wavelengths of less than 500 nm.

17. The non-transitory computer-readable medium of claim 15, wherein the program further causes the at least one processor to:

extract a feature vector from the image; and generate the one or more characteristics of the skin feature as a function of the feature vector and the received health information as applied to the machine learning model.

\* \* \* \* \*